United States Patent
Bohn et al.

(10) Patent No.: US 9,347,388 B2
(45) Date of Patent: May 24, 2016

(54) AUTOSTOP CUSTOMER ALERT FEATURE

(71) Applicant: GM Global Technology Operations LLC, Detroit, MI (US)

(72) Inventors: Timothy R. Bohn, Dexter, MI (US); Frank C. Valeri, Novi, MI (US); Scott M. Reilly, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 14/221,618

(22) Filed: Mar. 21, 2014

(65) Prior Publication Data

US 2015/0267628 A1    Sep. 24, 2015

(51) Int. Cl.
*F02N 11/08*    (2006.01)
*F02D 29/02*    (2006.01)
*F02D 41/04*    (2006.01)
*B60Q 3/02*    (2006.01)
*B60Q 5/00*    (2006.01)
*F02D 41/22*    (2006.01)

(52) U.S. Cl.
CPC ...... *F02D 29/02* (2013.01); *B60Q 3/02* (2013.01); *B60Q 5/008* (2013.01); *F02D 41/042* (2013.01); *F02N 11/0814* (2013.01); *F02D 2041/228* (2013.01)

(58) Field of Classification Search
CPC ............ F02D 41/042; F02N 11/0814–11/0844
USPC ................. 701/99, 101, 112; 123/179.4; 180/65.28; 381/71.4
See application file for complete search history.

(56) References Cited

U.S. PATENT DOCUMENTS

| | | | |
|---|---|---|---|
| 7,047,111 B2 * | 5/2006 | Schliep ............... | F02D 41/021 381/71.1 |
| 8,538,630 B2 * | 9/2013 | Matsuno ............. | H03M 1/188 381/71.1 |
| 2008/0292110 A1 * | 11/2008 | Kobayashi ......... | G10K 11/178 381/71.4 |
| 2012/0230504 A1 * | 9/2012 | Kuroda .............. | G10K 11/178 381/71.4 |
| 2015/0269925 A1 * | 9/2015 | Kanaya ............... | B60Q 5/008 381/71.4 |

* cited by examiner

*Primary Examiner* — Erick Solis

(57) ABSTRACT

A system includes a stop-start module that determines, based on characteristics of a vehicle, whether to deactivate an engine of the vehicle, that selectively deactivates the engine based on the characteristics, that, subsequent to deactivating the engine, selectively reactivates the engine based on the characteristics, and that generates an indication signal corresponding to the determination. A driver alert module receives the indication signal and selectively generates, based on the indication signal, a masking sound to be played by an audio system of the vehicle while the engine is deactivated.

20 Claims, 4 Drawing Sheets

AUTOSTOP CUSTOMER ALERT FEATURE

FIELD

The present disclosure relates to systems and methods for alerting a driver in the event of an automatic stop of a vehicle engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A stop-start vehicle includes an internal combustion engine (ICE) and a transmission. If the stop-start vehicle is, for example, a hybrid electric vehicle (HEV) and/or regenerates electrical energy, the stop-start vehicle may also include one or more electric motors. The stop-start vehicle may shutdown (deactivate) the ICE to reduce an idle time of the ICE. This improves fuel economy and reduces emissions. The ICE may be shut down (referred to as an autostop) when vehicle speed is less than a threshold for a predetermined period.

During an autostop, an ICE of a stop-start system may be shut down and/or transitioned to an at rest state (i.e. engine speed is equal to 0 revolutions/second). The ICE may be automatically started (referred to as an autostart), for example, when an accelerator pedal is actuated and/or an automatic transmission is transitioned from a drive (D) position. For example, when an accelerator pedal is pushed from an at rest position and/or a shifter of an automatic transmission is transitioned from a drive (D) position to a neutral (N) position, a reverse (R) position, a first gear (D1) position, a second gear (D2) position, etc., an autostart is performed to reactivate the ICE. Other events (either singly or in combination) that may trigger an autostop include, but are not limited to, a clutch pedal position, a brake pedal position, vehicle temperature, and/or battery state of charge.

SUMMARY

A system includes a stop-start module that determines, based on characteristics of a vehicle, whether to deactivate an engine of the vehicle, that selectively deactivates the engine based on the characteristics, that, subsequent to deactivating the engine, selectively reactivates the engine based on the characteristics, and that generates an indication signal corresponding to the determination. A driver alert module receives the indication signal and selectively generates, based on the indication signal, a masking sound to be played by an audio system of the vehicle while the engine is deactivated.

A method includes determining, based on characteristics of a vehicle, whether to deactivate an engine of the vehicle, selectively deactivating the engine based on the characteristics, subsequent to deactivating the engine, selectively reactivating the engine based on the characteristics, generating an indication signal corresponding to the determination, and selectively generating, based on the indication signal, a masking sound to be played by an audio system of the vehicle while the engine is deactivated.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In a stop-start vehicle, a stop-start system automatically stops and restarts an engine when the engine is idling to reduce the amount of time that the engine idles and thereby reduce fuel consumption and emissions of the engine. However, when the engine is stopped (i.e., during an autostop), a driver of the vehicle that is not familiar with the autostop feature may become concerned that the engine is stopped, and/or that the engine will not restart when needed. Further, the absence of sound generated by the engine may reveal undesirable sounds (e.g., vehicle and/or other ambient sounds) that can now be detected by the driver and passengers.

A stop-start system according to the principles of the present disclosure generates audio (or audio and visual) alerts to inform the driver of the vehicle that the autostop feature will be or has been activated. Accordingly, the driver is made aware that the engine has been intentionally stopped to save fuel and reduce emissions. The stop-start system may also generate predetermined and/or customizable sounds to mask the fact that the engine is stopped. For example, the generated sounds may prevent the driver and passengers from detecting undesirable vehicle and/or background sounds while the engine is stopped. For example only, sounds from vehicle components such as pumps, switches, motors, actuators, fans, etc. may become noticeable while the engine is stopped.

Figure 1:
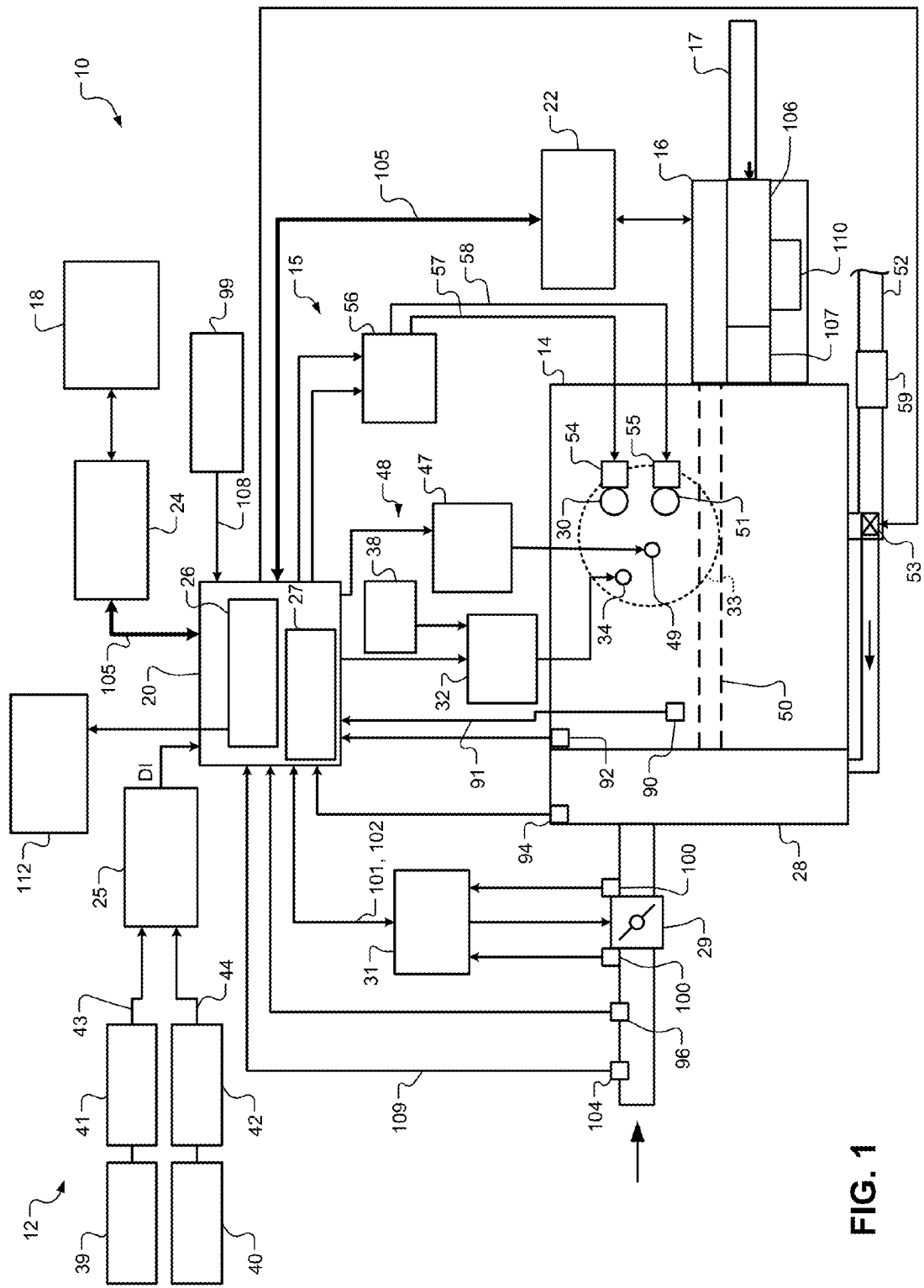
FIG. 1 is a functional block diagram of an example engine system according to the principles of the present disclosure.

In FIG. 1, a vehicle system 10 that includes a stop-start system 12 is shown. Although the vehicle system 10 is shown as a hybrid electric vehicle (HEV) system, the stop-start system 12 may be applied to other vehicle systems. The vehicle system 10 includes an internal combustion engine (ICE) 14 with a fully flexible valve actuation (FFVA) system 15, a transmission system 16, an electric motor and/or generator (motor/generator) 18 which are controlled respectively by an engine control module (ECM) 20, a transmission control module (TCM) 22, and a hybrid control module (HCM) 24. The HCM 24 may be, for example, a belt, alternator, starter (BAS) power inverter module (BPIM).

The stop-start system 12 includes one or more of the control modules 20, 22, 24, a stop-start control module 26, and an actuator control module 27. The stop-start control module 26 and the actuator control module 27 may be part of the ECM 20, part of another control module of the vehicle system 10, and/or may be separate control modules that communicate with the ECM 20. The stop-start control module 26 controls engine operations during autostarts and autostops of the ICE 14. During an autostop, an ICE of a stop-start system may be shut down and/or transitioned to an at rest state (i.e. engine speed is equal to 0 revolutions/second). For example, the ICE 14 may be automatically stopped and started based on various signals shown in FIG. 1 and/or any other signals that may not be shown (e.g., vehicle temperature, battery state of charge, etc.).

An autostart is performed when one or more of a first set of conditions are satisfied. An autostop is performed when one or more of a second set of conditions are satisfied to conserve fuel and provide requested torque to drive a vehicle. Parameters evaluated when determining whether to perform the autostop may be similar or the same as the parameters evaluated when determining whether to inhibit an autostop.

The vehicle system 10 and the stop-start system 12 operate in an autostart mode (or a restart mode) and an autostop mode (or shutdown mode). During the autostop mode, speed of the ICE 14 is decreased and fuel and spark of the ICE 14 are deactivated. During the autostop mode, the ICE 14 will coast down until it is stopped (stalled state). The ICE 14 is deactivated and speed of the ICE 14 is decreased to 0 RPM. The speed of the ICE 14 is equal to 0 RPM when, for example, the crankshaft of the ICE 14 is not rotating. The ICE 14 may be considered shutdown when fuel (or fuel system) and spark (or ignition system) are deactivated. During the autostart mode, the ICE 14 may be cranked (crank state) and speed of the ICE 14 may be increased to an idle speed (idle state). Fuel and spark are activated during the autostart mode.

While a spark ignition direct injection (SIDI) type engine is described herein, the present disclosure is applicable to other types of torque producers, such as gasoline type engines, gaseous fuel type engines, port fuel injection engines, diesel type engines, propane type engines, and hybrid type engines. The ICE 14 combusts an air/fuel mixture to produce drive torque for a vehicle based on information from a driver input module 25 (e.g., driver input signal DI) and other information described below. The ICE 14 may be a 4-stroke engine where the piston is cycled iteratively through intake, compression, power/expansion and compression strokes.

In operation, air is drawn into an intake manifold 28 of the ICE 14 through a throttle valve 29 and/or a one or more intake valve(s) 30 of the FFVA system 15. The ECM 20 commands a throttle actuator module 31 to regulate opening of the throttle valve 29 to control the amount of air drawn into the intake manifold 28 based on, for example, information from the driver input module 25. The vehicle system 10 may not include the throttle valve 29 and the throttle actuator module 31. The ECM 20 commands a fuel actuator module 32 to control the amount of fuel injected into the intake manifold 28, intake runner, and/or a cylinder 33, via for example a fuel injector 34. Fuel injectors of the ICE 14 are identified as 34.

Fuel may be pumped to the fuel injector 34 via one or more fuel pumps, such as the fuel pump 38. The fuel pumps may include a high-pressure fuel pump and a low-pressure fuel pump, where the fuel pump 38 is the high-pressure fuel pump and provides fuel at a high-pressure to a fuel rail (shown in FIG. 3) of the fuel injector 34. Although a single cylinder is shown, the ICE 14 may include any number of cylinders with corresponding injectors and intake and exhaust valves.

The driver input module 25 may receive signals from, for example, sensors of a brake actuator 39 (e.g., brake pedal) and/or an accelerator 40 (e.g., accelerator pedal). The sensors may include a brake sensor 41 and an accelerator pedal sensor 42. The driver input signal DI may include a brake pedal signal BRK 43 and an accelerator pedal signal PEDAL 44. Air from the intake manifold 28 is drawn into the cylinder 33 through an intake valve 30.

The ECM 20 controls the amount of fuel injected into the intake manifold 28 and/or the cylinder 33. The injected fuel mixes with the air and creates the air/fuel mixture in the cylinder 33. A piston (not shown) within the cylinder 33 compresses the air/fuel mixture. Based upon a signal from the ECM 20, a spark actuator module 47 of an ignition system 48 energizes a spark plug 49 in the cylinder 33, which ignites the air/fuel mixture.

The combustion of the air/fuel mixture drives the piston down, thereby driving a rotating crankshaft 50. The piston then begins moving up again and expels the byproducts of combustion through an exhaust valve 51 of the FFVA system 15. The byproducts of combustion are exhausted from the vehicle via an exhaust system 52. The exhaust system 52 may include an exhaust gas recirculation (EGR) valve 53, which may be used to recirculate exhaust gas from the exhaust system 52 back to the intake manifold 28 and/or cylinders of the ICE 14 (e.g., the cylinder 33). Exhaust gas passes through a catalyst 59 prior to being released to the atmosphere.

The intake and exhaust valves 30, 51 may be electronically controlled by a valve actuator module 56 via valve actuators 54, 55. The valve actuator module 56 may generate valve control signals VCS1 57, VCS2 58 to control position of the valves 30, 51. The valve actuators 54, 55 may include solenoids. The ECM 20 may control individual position of each of the intake and exhaust valves 30, 51 during autostart and autostop modes.

The vehicle system 10 may detect the position and measure the speed of the crankshaft 50 (engine speed) using one or more engine position and/or speed sensor(s) 90. In one implementation, a single sensor with a single sensing element is used to detect position and speed of the crankshaft 50. The speed sensor 90 may generate a crankshaft signal CRK 91. Temperature of the ICE 14 may be measured using an engine coolant or oil temperature (ECT) sensor 92.

The pressure within the intake manifold 28 may be measured using a manifold absolute pressure (MAP) sensor 94. In various implementations, engine vacuum may be measured, where engine vacuum is the difference between ambient air pressure and the pressure within the intake manifold 28. The mass of air flowing into the intake manifold 28 may be measured using a mass air flow (MAF) sensor 96. The ECM 20 determines cylinder fresh air charge primarily from the MAF sensor 96 and calculates a desired fuel mass using open loop, closed loop and transient fueling algorithms. Fuel injector characterization functions convert the desired fuel mass into an injector on time, which is executed by fuel injector outputs of the ECM 20.

Although the vehicle system is shown as including the throttle valve 29 and a throttle actuator module 31, the flow of air into the cylinder 33, may be controlled via the valve actuator module 56. For example, the valve actuator module 56 may adjust position of the intake valve 30 to adjust air flow into the cylinder 33, instead of or in addition to the throttle actuator module 31 adjusting position of the throttle valve 29. The valve actuator module 56 may be used to control air into the cylinder 33 when the throttle valve 29 is not included in the vehicle system 10.

The throttle actuator module 31 may monitor position of the throttle valve 29 using one or more throttle position sensors (TPS) 100. Throttle position signals THR1 101 and THR2 102 may be transmitted between the throttle actuator module 31 and the ECM 20. The first throttle position signal THR1 101 may indicate to the ECM 20 and/or the stop-start control module 26 position of the throttle valve 29. The second throttle position signal THR2 102 may be transmitted from the ECM 20 to the throttle actuator module 31 to command a throttle valve position. In one implementation, the signals TPS1, TPS2 from the sensors 100 may be used to determine a redundant, single throttle position. Each of the signals TPS1, TPS2 from the sensors 100 may be used to perform diagnostics on the other one of the signals TPS1, TPS2. Vehicle speed may be determined via a vehicle speed sensor 99 to generate a vehicle speed signal Vspd 108.

The control modules of the vehicle system 10 may communicate with each other via serial and/or parallel connections and/or via a control area network (CAN) 105. For example, the ECM 20 may communicate with the TCM 22 to coordinate shifting gears in the transmission system 16 and adjust reduce torque during a gear shift. As another example, the ECM 20 may communicate with a HCM 24 to coordinate operation of the ICE 14 and the motor/generator 18. The motor/generator 18 may be used to: assist the ICE 14; replace power from the ICE 14, and/or start the ICE 14. In addition, the control modules may share parameter values associated with determining whether to perform an autostart and an autostop.

The transmission system 16 includes a transmission 106 and a torque converter 107 and may include an auxiliary pump 110. The auxiliary pump 110 is external to the transmission 106 and maintains fluid pressure within the transmission 106 to maintain engagement of gear(s) and/or clutch(es). For example, a first gear may be held in an engaged state during a neutral idle mode using the auxiliary pump 110. Devices other than the auxiliary pump 110 may be used to maintain pressure, such as an accumulator.

In various implementations, the ECM 20, the TCM 22, the HCM 24 and other control modules of the vehicle system 10 may be integrated into one or more modules.

The stop-start system 12 according to the principles of the present disclosure further includes a driver alert module 112. The driver alert module 112 generates one or more alerts (e.g., audio alerts or audio and visual alerts) to alert the driver and passengers that the autostop feature has stopped or will stop the ICE 14. The driver alert module 112 may also generate one or more masking sounds while the ICE 14 is stopped.

Figure 2:
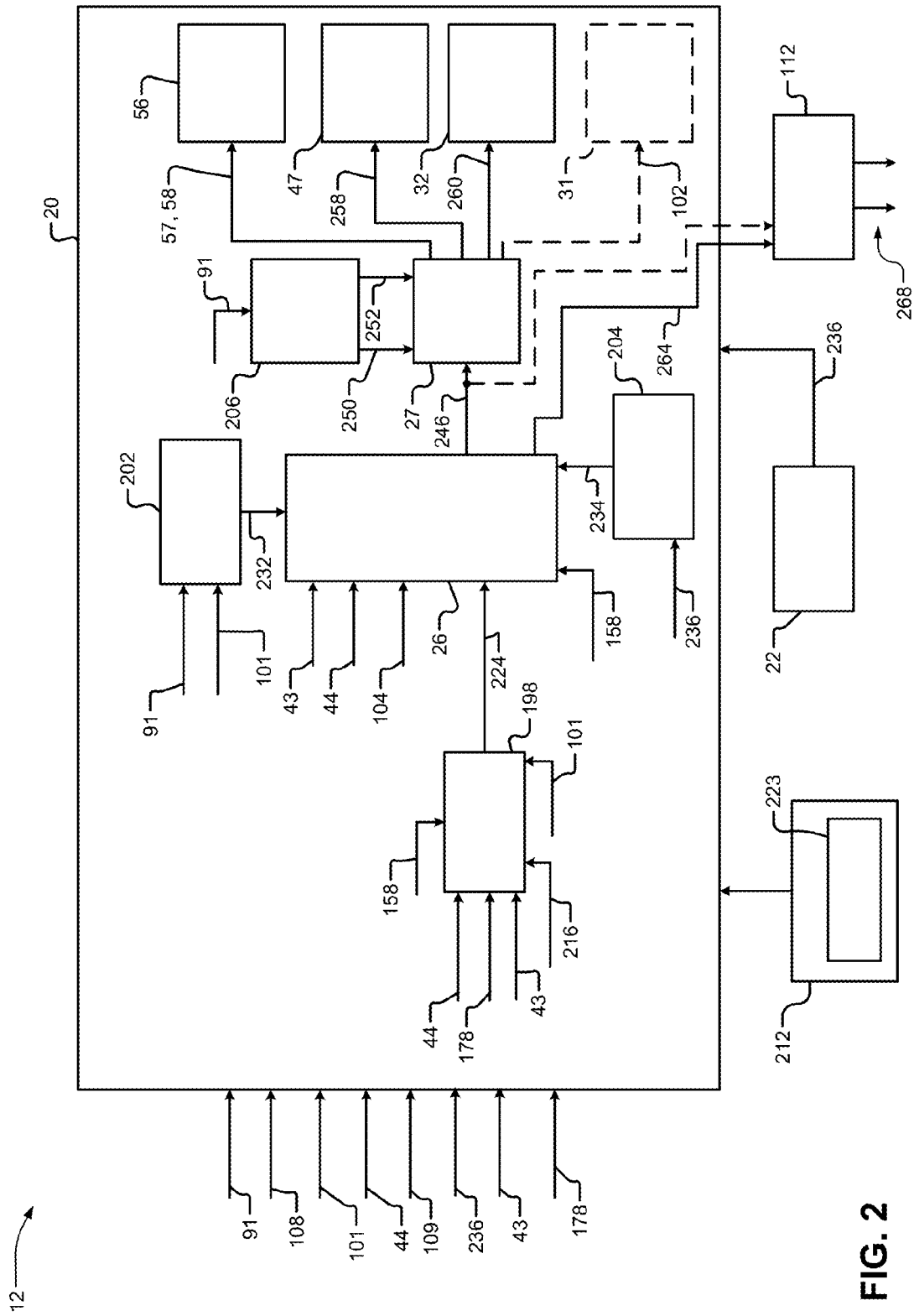
FIG. 2 is a functional block diagram of an example engine control module including a driver alert module according to the principles of the present disclosure.

Referring now to FIG. 2, a portion of the stop-start system 12 relevant to the principles of the present disclosure is shown. The stop-start system 12 includes the ECM 20, the TCM 22, and the driver alert module 112. The ECM 20 includes the stop-start control module 26 and the actuator control module 27. The stop-start control module 26 initiates autostops (shutdowns) and autostarts (restarts) of the ICE 14. The actuator control module 27 controls operation of the ICE 14 during the autostarts and autostops. The stop-start control module 26 and the actuator control module 27 may perform autostarts and autostops based on information received from various sensors, systems and/or modules of the vehicle system 10 and the stop-start system 12. Some of these sensors, systems and modules and corresponding signals are shown in FIG. 2.

The sensors may include, for example, the brake sensor 41, the accelerator pedal sensor 42, the engine speed sensor 90, the vehicle speed sensor 99, the throttle position sensors 100 (or throttle actuator module), an intake air temperature sensor 104, and other sensors such as an ambient temperature sensor. The sensors 41, 42, 90, 99, 104 provide the brake signal BRK 43, the accelerator pedal signal PEDAL 44, the crankshaft signal CRK 91, a vehicle speed signal Vspd 108, and an intake air temperature signal IAT 109. The throttle position sensors 100 may provide throttle position signals, which may be received by the throttle actuator module 31 and/or by the ECM 20. The throttle actuator module 31 and/or the ECM 20 may generate the first throttle position signal THR1 101. The ECM 20 may receive one or more additional signals, not shown in FIG. 2, that may be used to determine whether to activate the autostop or autostart feature, including, but not limited to, a clutch pedal position signal.

The stop-start system 12 may further include a driver monitoring module 198, an engine monitoring module 202, and a transmission monitoring module 204, the actuator control module 27, a crankshaft module 206, the valve actuator module 56, the spark actuator module 47, the fuel actuator module 32, and/or the throttle actuator module 31. The driver monitoring module 198 monitors current driver behavioral activity and stores driver behavioral information in driver history tables 223 in the memory 212. The driver monitoring module 198 may monitor one or more of the signals BRK 43, PEDAL 44, THR1 101, Vspd 108, and a cruise control signal CCTRL 178 and generates a driver signal DRV 224 indicating expected driver behavior information. The behavioral information may include accelerator pedal positions, vehicle acceleration values, vehicle speeds, amounts of time at accelerator pedal positions, amounts of time at throttle positions, amounts of time at brake pedal positions, brake pressures, brake pressure apply periods, cruise control states, power request history of the driver to the drivetrain, etc.

The engine monitoring module 202 monitors states of the ICE 14 including, for example, engine speed and throttle position. The engine monitoring module 202 may generate an engine signal ENG 232 based on the signals CRK 91 and THR1 101.

The transmission monitoring module 204 monitors states of the transmission and generates a first transmission status signal TRANS1 234. The transmission monitoring module 204 may generate the first transmission status signal TRANS1 234 based on a second transmission status signal TRANS2 236 from the TCM 22. The first transmission status signal TRANS1 234 may indicate: a current gear of the transmission 106; whether the transmission 106 is operating in a tow mode; a load on the transmission 106; etc. The load on the transmission 106 may be determined, for example, based on an engine speed, torque profiles of the ICE 14 and transmission 106, and/or outputs of one or more strain and/or pressure sensors.

As an example, the stop-start control module 26 may initiate the autostarts and autostops based on one or more of the signals BRK 43, PEDAL 44, DRV 224, and TRANS1 234, and/or other signals that may not be shown, such as a clutch pedal position signal. The stop-start control module 26 generates a stop-start signal SS 246 to request that an autostart or an autostop be performed. As an example, when a shifter of the transmission 106 transitions from a drive (D) position to a neutral (N) position, a reverse (R) position, a first gear (D1) position, a second gear (D2) position, etc., the TCM 22 may request that an autostop be inhibited and/or that an autostart be performed.

The crankshaft module 206 monitors the crankshaft signal CRK 91 and generates a first position signal POS1 250 and an engine speed signal RPM 252, which are provided to the actuator control module 27. The actuator control module 27 performs autostarts and autostops based on the stop-start signal SS 246. The actuator control module 27 generates one or more of the second throttle signal THR2 102, the valve control signals VCS1 57, VCS2 58, a spark control signal SPARK 258, and a fuel control signal FUEL 260 based on the stop-start signal SS 246.

The actuator modules 31, 32, 47 and 56 may adjust fuel, air flow, spark, and intake and exhaust valve parameters for each of the cylinders of the ICE 14 in response to the signals SPARK 258, FUEL 260, THR2 102, VCS1 57, VCS2 58. The fuel parameters may include, for example, fuel injection quantity, fuel injection pressure, fuel injection timing, etc. The air flow parameters may include air volumes, air pressures, etc. The spark parameters may include, for example, spark energy and spark timing. The intake and exhaust valve parameters may include positions for each of the valves 30, 51.

The stop-start control module 26 provides an autostop indication signal 264 to the driver alert module 112 when the stop-start SS signal 246 is generated. For example, the stop-start control module 26 generates the autostop indication signal 264 at a same time that the stop-start SS signal 246 is generated to request an autostop. Alternatively, the stop-start SS signal 246 may simply be provided to the driver alert module 112 as an indication of the autostop.

In response to receiving the autostop indication signal 264, the driver alert module 112 generates one or more control signals 268 to alert the driver that the autostop feature has been or will be activated. For example, the control signals 268 may actuate an audio indicator (e.g., a beep, chime, buzz, etc., or other predetermined or customizable sound played via an audio system of the vehicle), or an audio indicator in combination with a visual indicator (e.g., a dashboard LED, an icon on a navigation or other console display, etc.). The audio indicator may include a plurality of sounds (i.e., audio cues) that are activated in a sequence during various transitions of the autostop feature. For example, the audio indicator may include a first sound that is activated before the autostop feature is activated, a second sound that is activated once the autostop feature is activated, and a third sound when the autostart feature is activated (i.e., after the autostop is complete and the engine is restarted). The sounds may be the same or may be different. The visual indicator may include a similar plurality of visual cues.

If the driver alert module 112 determines that the engine will be stopped (i.e., the autostop feature will be activated), the driver alert module 112 may, using the control signals 268, activate a predetermined and/or customizable background (masking) sound to be played through the audio system of the vehicle. The background sound masks the transition of the engine through the autostop and autostart features, and/or to conceal any other sounds/disturbances that become audible with the engine stopped. The driver alert module 112 may begin ramping up (i.e., increasing a volume of) the background sound prior to the engine being stopped until reaching a predetermined or steady-state volume that is maintained during the autostop, then begin ramping down the background sound when after the engine is restarted. The background sound may be modified to blend with the sound of the engine being restarted. For example, when the autostop indication signal 264 indicates that the engine will be or has been restarted, the driver alert module 112 modifies the masking sound accordingly.

Accordingly, the background sound is played throughout the entire engine stop event. For example only, the background sound may include music (e.g., elevator type music), white noise, and/or a sound of the engine. In some implementations, the driver alert module 112 may simply increase the volume of the vehicle audio system during the engine stop event if the driver is already listening to the audio system (e.g., listening to the radio).

The background sound may include a pre-recorded engine sound. For example, the driver alert module 112 may include a memory (not shown) that records the sound of the running engine just prior to activating the autostop feature. In some implementations, the driver alert module 112 may record, via one or more audio inputs, the engine sound in response to receiving an indication that the engine will be stopped (e.g., in response to receiving the autostop indication signal 264). Accordingly, the background sound corresponds to the sound of the engine running just prior to the engine being stopped. In other implementations, the driver alert module 112 may continuously record the sound of the engine running and store only a most recent predetermined period (e.g., 5 seconds). In other words, the driver alert module 112 may continuously buffer the most recent 5 seconds of the engine sound to be replayed while the engine is stopped. This recorded engine sound may be looped (i.e., played repeatedly) until the engine is restarted.

When recording the engine sound, the driver alert module 112 may identify and filter out other background sounds that do not correspond to the engine sound. For example, the driver alert module 112 may be configured to identify background sounds including, but not limited to, voices (e.g., from the driver and passengers), horns or other traffic sounds, other vehicles sounds such as sounds from a vehicle HVAC, audio system, etc., and/or other extraneous sounds. The driver alert module 112 filters out these other background sounds from the recording of the engine sound. Accordingly, when the engine sound is replayed as a masking sound, the engine sound does not include other undesirable sounds.

In other implementations, the driver alert module 112 may select one or more predetermined engine sounds to play while the engine is stopped. For example, the driver alert module 112 may store a plurality of predetermined engine sounds and select one of the predetermined engine sounds based on one or more factors (e.g., vehicle operating parameters) including, but not limited to, driver preference (based on a known driver), mode of the vehicle (e.g., a "race" or other "sport" mode, which may correspond to a position of an exhaust system valve configured to selectively mask/enhance engine exhaust sounds), and/or driving characteristics/habits of the driver for a predetermined period prior to the autostop. For example, if the vehicle is in a race or sport mode, the driver may prefer to hear a more prominent and/or "sportier" engine sound. Accordingly, the driver alert module 112 may select a predetermined engine sound accordingly. The recorded engine sounds described in the previous paragraph may also be adjusted based on these factors.

Other vehicle parameters that may affect the selection of a predetermined engine sound and/or an adjustment of a recorded engine sound include, but are not limited to, current HVAC settings, idle characteristics (e.g., high idle or low idle), one or more detected vehicle system frequencies, whether or not the cold start conditions are present, a last known RPM and/or torque prior to activating the autostop, etc.

The recorded or predetermined engine sound may be modified to blend with the sound of the engine being restarted. For example, the driver alert module 112 may determine how to modify the recorded or predetermined engine sound based on anticipated engine sounds during the autostart. For example only, any of the above factors (e.g., driver habits, vehicle mode, etc.), as well as any events that may affect the sound of the engine starting (e.g., a torque request, by the driver, that initiates the autostart) may be monitored by the driver alert module 112 to determine how to modify the recorded or predetermined engine sound to blend with the sound of the engine being restarted.

In still other implementations, the driver alert module 112 may determine that activating any masking sounds is unnecessary due to other sounds that may be present. In other words, other sounds such as the HVAC system, the vehicle audio system, etc. may be present and already provide a masking function while the engine is stopped. The driver alert module 112 may determine, based on selected settings of one or vehicle subsystems, whether corresponding sounds from these subsystems are greater than a threshold. If the volume is greater than the threshold, then the driver alert module 112 may determine that playing the masking sound while the engine is stopped is not necessary. Conversely, if the volume is less than or equal to the threshold, the driver alert module 112 activates the masking sound in response to the autostop indication signal 264.

Figure 3:
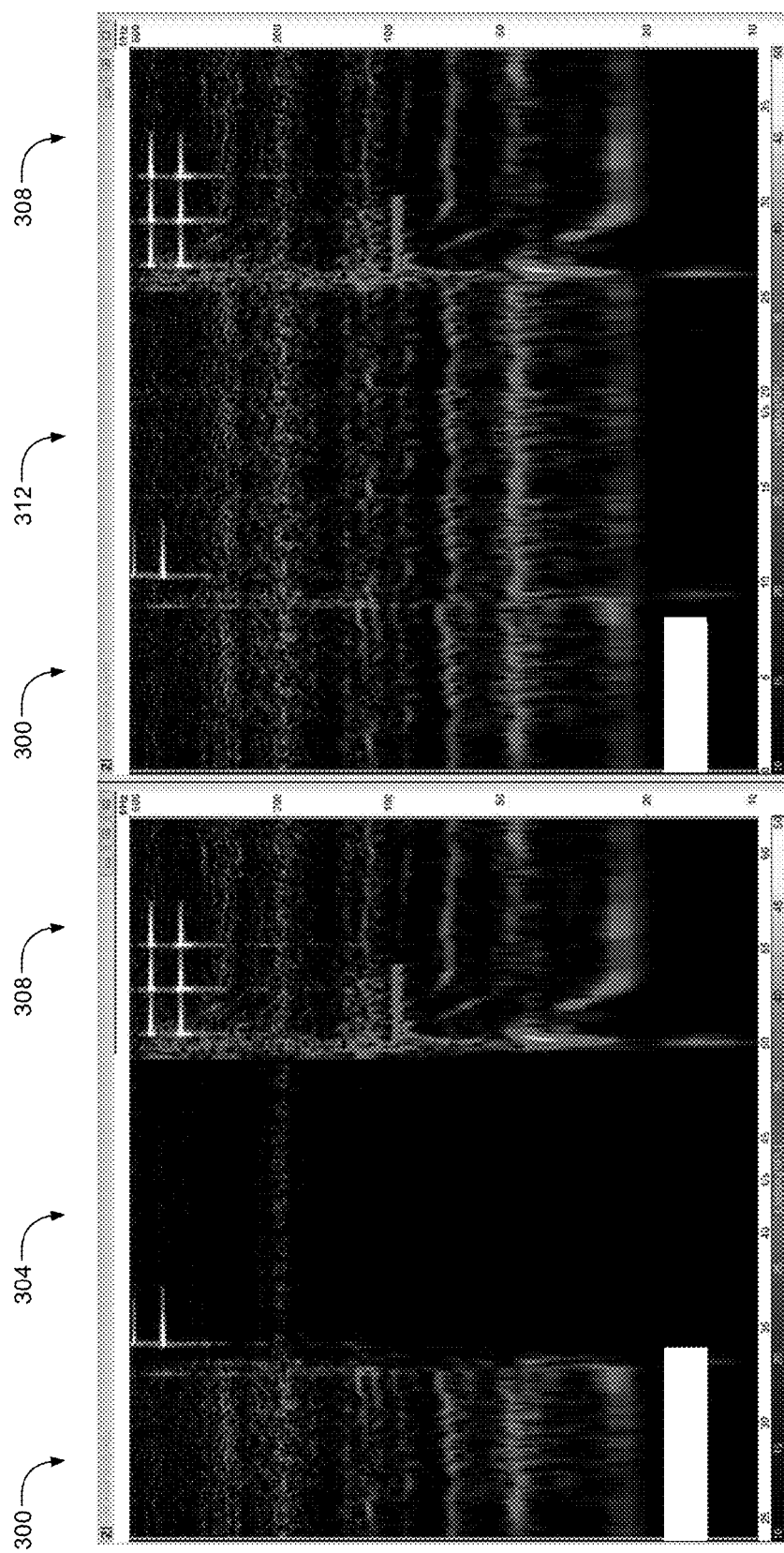
FIG. 3 illustrates example audio signals in a vehicle during an autostop event according to the principles of the present disclosure.

Referring now to FIG. 3, various audio signals (e.g., that are audible while the engine is running, prior to an autostop event) are shown at 300. At 304, the audio signals are shown with the engine stopped and no background sound being played. At 308, the audio signals are shown subsequent to the autostop event. The audio signals are shown with the engine stopped and the background sound being played according to the principles of the present disclosure at 312.

Figure 4:
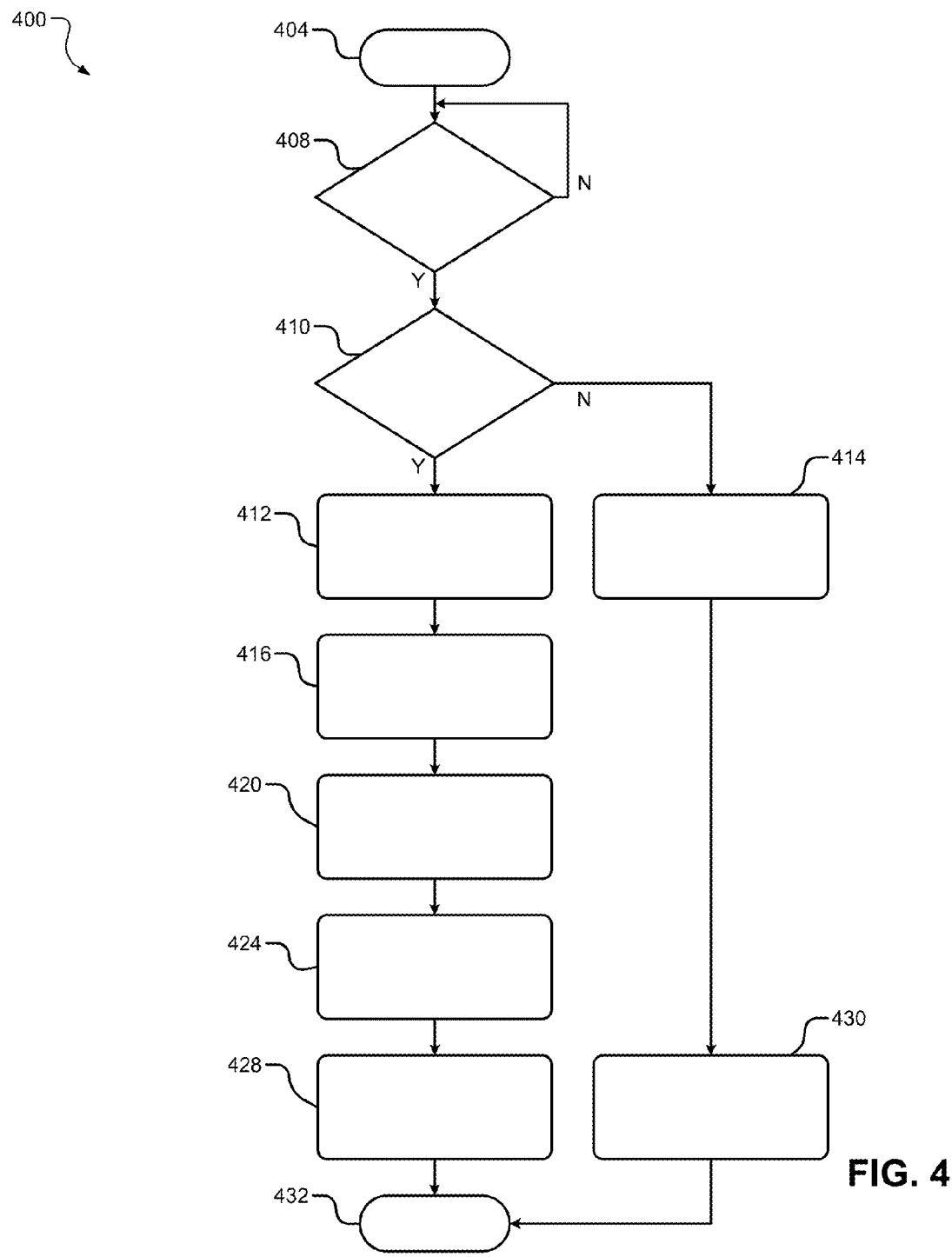
FIG. 4 illustrates an example stop-start driver alert method according to the principles of the present disclosure.

Referring now to FIG. 4, an example stop-start driver alert method 400 begins at 404. At 408, the method 400 determines whether an autostop feature is available (i.e., whether vehicle conditions required for autostop are present). If true, the method 400 continues to 410. If false, the method 400 continues to 408. At 410, the method 400 determines whether a background sound (i.e., a masking sound) is necessary as described above with respect to FIG. 2. For example, the method 400 may determine whether masking sounds are necessary based on levels of other sounds that may be present. If true, the method 400 continues to 412. If false, the method 400 continues to 414.

At 412, the method 400 begins to ramp up a predetermined or customized (e.g., by the driver) background sound and/or activates audio/visual indicators that alert the driver that the autostop feature has been or will be activated. At 416, the engine is stopped as the background sound reaches a predetermined or customizable volume. At 420, an engine restart procedure is initiated as the method 400 begins to modify the background sound to blend with the sound of the engine restarting. At 424, the engine is started. At 428, the method 400 ramps down the background sound and/or deactivates the audio/visual indicators. If the result of 410 is false, the method 400 may activate only audio/visual indicators at 414. At 430, the method 400 deactivates the audio/visual indicators after the engine is started. The method 400 ends at 432.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system, comprising:
   a stop-start module that determines, based on characteristics of a vehicle, whether to deactivate an engine of the vehicle, that selectively deactivates the engine based on the characteristics, that, subsequent to deactivating the engine, selectively reactivates the engine based on the characteristics, and that generates an indication signal corresponding to the determination; and
   a driver alert module that receives the indication signal and selectively generates, based on the indication signal, a masking sound to be played by an audio system of the vehicle while the engine is deactivated.

2. The system of claim 1, wherein the masking sound includes an engine sound.

3. The system of claim 2, wherein the engine sound includes at least one of a selected one of a plurality of predetermined engine sounds and a recorded engine sound.

4. The system of claim 3, wherein the driver alert module selects the selected one of the plurality of predetermined engine sounds based on one or more of the characteristics of the vehicle.

5. The system of claim 3, wherein the recorded engine sound corresponds to a sound of the engine from the determination of whether to deactivate the engine to the engine being deactivated.

6. The system of claim 1, wherein the driver alert module selectively generates an audio indicator at least one of prior to, during, and subsequent to the engine being deactivated.

7. The system of claim 6, wherein the driver alert module selectively generates the audio indicator and a visual indicator.

8. The system of claim 1, wherein the indication signal further corresponds to the engine being reactivated, and wherein the driver alert module at least one of modifies and terminates the masking sound in response to the indication signal indicating that the engine will be reactivated.

9. The system of claim 8, wherein modifying the masking sound includes decreasing a volume of the masking sound in response to the indication signal indicating that the engine will be reactivated and/or the engine has been reactivated.

10. The system of claim 8, wherein modifying the masking sound includes adjusting the masking sound based on an anticipated sound of the engine being reactivated.

11. A method, comprising:
   determining, based on characteristics of a vehicle, whether to deactivate an engine of the vehicle;
   selectively deactivating the engine based on the characteristics;
   subsequent to deactivating the engine, selectively reactivating the engine based on the characteristics;
   generating an indication signal corresponding to the determination; and
   selectively generating, based on the indication signal, a masking sound to be played by an audio system of the vehicle while the engine is deactivated.

12. The method of claim 11, wherein the masking sound includes an engine sound.

13. The method of claim 12, wherein the engine sound includes at least one of a selected one of a plurality of predetermined engine sounds and a recorded engine sound.

14. The method of claim 13, further comprising selecting the selected one of the plurality of predetermined engine sounds based on one or more of the characteristics of the vehicle.

15. The method of claim 13, wherein the recorded engine sound corresponds to a sound of the engine from the determination of whether to deactivate the engine to the engine being deactivated.

16. The method of claim 11, further comprising selectively generating an audio indicator at least one of prior to, during, and subsequent to the engine being deactivated.

17. The method of claim 16, further comprising selectively generating the audio indicator and a visual indicator.

18. The method of claim 11, wherein the indication signal further corresponds to the engine being reactivated, and further comprising at least one of modifying and terminating the masking sound in response to the indication signal indicating that the engine will be reactivated.

19. The method of claim 18, wherein modifying the masking sound includes decreasing a volume of the masking sound in response to the indication signal indicating that the engine will be reactivated and/or that the engine has been reactivated.

20. The method of claim 18, wherein modifying the masking sound includes adjusting the masking sound based on an anticipated sound of the engine being reactivated.

* * * * *